(12) United States Patent
Kanou

(10) Patent No.: US 9,394,590 B2
(45) Date of Patent: Jul. 19, 2016

(54) LOW α-DOSE TIN OR TIN ALLOY, AND METHOD FOR PRODUCING SAME

(75) Inventor: Gaku Kanou, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 288 days.

(21) Appl. No.: 13/634,946

(22) PCT Filed: Feb. 14, 2011

(86) PCT No.: PCT/JP2011/053024
§ 371 (c)(1),
(2), (4) Date: Oct. 15, 2012

(87) PCT Pub. No.: WO2011/114824
PCT Pub. Date: Sep. 22, 2011

(65) Prior Publication Data
US 2013/0028786 A1    Jan. 31, 2013

(30) Foreign Application Priority Data
Mar. 16, 2010 (JP) ................................. 2010-059598

(51) Int. Cl.
C25C 1/14 (2006.01)
C22C 13/00 (2006.01)
B23K 35/26 (2006.01)
B23K 35/36 (2006.01)
B23K 35/40 (2006.01)

(52) U.S. Cl.
CPC ............... *C22C 13/00* (2013.01); *B23K 35/262* (2013.01); *B23K 35/36* (2013.01); *B23K 35/40* (2013.01); *B23K 2201/40* (2013.01)

(58) Field of Classification Search
CPC ................................. B22D 23/00; B23K 35/40
USPC ............................................................. 420/558
See application file for complete search history.

(56) References Cited

U.S. PATENT DOCUMENTS

2009/0098012 A1    4/2009   Shindo et al.
2014/0332404 A1   11/2014   Shindo et al.

FOREIGN PATENT DOCUMENTS

| JP | 59-064790 A | 4/1984 |
| JP | 59064791 A | 4/1984 |
| JP | 01-283398 A | 11/1989 |

(Continued)

OTHER PUBLICATIONS

NPL: machine translation of JP 1999-080852A , Mar. 1999.*

(Continued)

*Primary Examiner* — Jie Yang
(74) *Attorney, Agent, or Firm* — Howson & Howson LLP

(57) ABSTRACT

Disclosed is tin characterized in that a sample of the tin after melting and casting has an α dose of less than 0.0005 cph/cm². Since recent semiconductor devices are highly densified and of high capacity, there is an increasing risk of soft errors caused by the influence of α rays emitted from materials in the vicinity of semiconductor chips. In particular, there are strong demands for high purification of solder materials and tin for use in the vicinity of semiconductor devices, and demands for materials with lower α rays. Accordingly, an object of the present invention is to clarify the phenomenon of the generation of α rays in tin and tin alloys, and to obtain high-purity tin, in which the α dose has been reduced, suitable for the required materials, as well as a method for producing the same.

9 Claims, 3 Drawing Sheets

(56) References Cited

FOREIGN PATENT DOCUMENTS

| | | |
|---|---|---|
| JP | 02-228487 A | 9/1990 |
| JP | 05-077087 A | 3/1993 |
| JP | 06-182580 A | 7/1994 |
| JP | 09-260427 A | 10/1997 |
| JP | 11-080852 A | 3/1999 |
| JP | 11-343590 A | 12/1999 |
| JP | 2001-009588 A | 1/2001 |
| JP | 2001-271159 A | 10/2001 |
| JP | 2003-193283 A | 7/2003 |
| JP | 2003-303787 A | 10/2003 |
| JP | 2004-244711 A | 9/2004 |
| WO | 2007/004394 A1 | 1/2007 |

OTHER PUBLICATIONS

NPL: machine translation of JP 2009074115A, Apr. 2009.*
Espacenet, Bibliographic data including English Abstract for JP 01-283398 A of Sumita et al., Nov. 14, 1989.

* cited by examiner

LOW α-DOSE TIN OR TIN ALLOY, AND METHOD FOR PRODUCING SAME

BACKGROUND

The present invention relates to tin or tin alloys, in which the α (alpha) dose has been reduced, for use in the production of semiconductors, etc., and a method for producing the same.

Generally, tin is a material used in the production of semiconductors, and is particularly a main raw material for solder materials. In the production of semiconductors, when a semiconductor chip and a substrate are bonded, and an Si chip, such as IC or LSI, is bonded to or sealed in a lead frame or a ceramics package, solder is used to form bumps during TAB (tape automated bonding) or during the manufacture of flip chips, and is used as a semiconductor wiring material.

Since recent semiconductor devices are highly densified and of low operation voltage and cell capacity, there is an increasing risk of soft errors caused by the influence of α rays emitted from materials in the vicinity of semiconductor chips. For this reason, there are demands for high purification of the aforementioned solder materials and tin, and demands for materials with lower α rays.

There are several disclosures relating to techniques for reducing α rays from tin. These techniques are described below. Document 1 discloses a method for producing low α-dose tin by alloying tin and lead having an α dose of 10 $cph/cm^2$ or less, and then removing the lead from the tin by refining. This technique is intended to reduce the α dose by diluting $^{210}Pb$ in the tin through the addition of high-purity Pb.

However, this method requires a complex process of removing Pb after being added to tin. Furthermore, the refined tin showed a significantly lower α dose in three years after refining; however, it can also be interpreted that the tin with a lower α dose cannot be used until three years later. Accordingly, this method is not considered to be industrially efficient.

Document 2 indicates that when 10 to 5,000 ppm of a material selected from Na, Sr, K, Cr, Nb, Mn, V, Ta, Si, Zr and Ba is added to Sn—Pb alloy solder, the radiation α particle count can be reduced to 0.5 $cph/cm^2$ or less.

However, even with the addition of such materials, the radiation α particle count could be reduced only to a level of 0.015 $cph/cm^2$, which does not reach the level expected for current semiconductor device materials.

Another problem is that alkali metal elements, transition metal elements, heavy metal elements, and other elements that are undesirably mixed in semiconductors are used as the materials to be added. Therefore, it would have to be said that this is a low level material for assembling semiconductor devices.

Document 3 describes reducing the count of radiation α particles emitted from solder ultra fine wires to 0.5 $cph/cm^2$ or less, and using the same as the connection wiring of semiconductor devices. However, this level of count of radiation α particles does not reach the level expected for current semiconductor device materials.

Document 4 describes using highly-refined sulfuric acid, such as top-grade sulfuric acid, and highly-refined hydrochloric acid, such as top-grade hydrochloric acid, to form an electrolyte, and using high-purity tin as the anode to perform electrolysis, thereby obtaining high-purity tin having a low lead concentration and a lead α-ray count of 0.005 $cph/cm^2$ or less. It is natural that high-purity materials can be obtained by using high-purity raw materials (reagents) without regard to cost. Nevertheless, the lowest α-ray count of the deposited tin shown in an Example of Document 4 is 0.002 $cph/cm^2$, which does not reach the expected level, despite the high cost.

Document 5 discloses a method for obtaining metallic tin of 5N or higher by adding nitric acid to a heated aqueous solution containing crude metallic tin to precipitate metastannic acid, followed by filtration and washing, then dissolving the metastannic acid, which was subject to washing, in hydrochloric acid or hydrofluoric acid, and performing electrowinning using the dissolution as an electrolyte. Document 5 vaguely states that this technique can be applied to semiconductor devices, but does not refer to limitation of radioactive elements or limitation of the radiation α particle count. Thus, Document 5 lacks interest in these limitations.

Document 6 shows a technique of reducing the amount of Pb contained in Sn, which constitutes a solder alloy, and using Bi, Sb, Ag or Zn as an alloy material. In this case, however, even though the amount of Pb is reduced as much as possible, no means are provided to fundamentally solve the problem of the radiation α particle count caused by the Pb being inevitably incorporated.

Document 7 discloses tin having a grade of 99.99% or higher and a radiation α particle count of 0.03 $cph/cm^2$ or less, produced by electrolysis using a top-grade sulfuric acid reagent. In this case, it is also natural that high-purity materials can be obtained by using high-purity raw materials (reagents) without regard to cost. Nevertheless, the lowest α-ray count of the deposited tin shown in an Example of Document 7 is 0.003 $cph/cm^2$, which does not reach the expected level, despite the high cost.

Document 8 discloses lead as a brazing filler metal for use in semiconductor devices, which has a grade of 4N or higher, a radioisotope of less than 50 ppm, and a radiation α particle count of 0.5 $cph/cm^2$ or less. In addition, Document 9 discloses tin as a brazing filler metal for use in semiconductor devices, which has a grade of 99.95% or higher, a radioisotope of less than 30 ppm, and a radiation α particle count of 0.2 $cph/cm^2$ or less.

In Document 8 and Document 9, allowable values concerning the radiation α particle count are respectively lenient, and there is a problem in that the techniques of these documents do not reach the level expected for current semiconductor device materials.

In light of the above, the present applicant has proposed, as shown in Document 10, high-purity tin wherein the purity is 5N or higher (excluding gas components O, C, N, H, S, and P), especially the respective contents of U and Th as radioactive elements are 5 ppb or less, and the respective contents of Pb and Bi that emit radiation α particles are 1 ppm or less, in order to eliminate the influence of α rays on semiconductor chips as much as possible. In this case, the high-purity tin is produced by being finally melted and cast, and optionally being rolled and cut. Document 10 relates to a technique for realizing that the α-ray count of the high-purity tin is 0.001 $cph/cm^2$ or less.

When Sn is refined, Po, which is highly sublimable, sublimates upon heating in the production process, such as melting and casting process. If polonium isotope $^{210}Po$ is removed in the early stages of production, it is naturally considered that disintegration of polonium isotope $^{210}Po$ to lead isotope $^{206}Pb$ does not occur, and α rays are not generated.

This is because the generation of α rays in the production process presumably occurs during the disintegration of $^{210}Po$ to lead isotope $^{206}Pb$. In fact, however, the generation of α rays was subsequently observed, although it was considered that Po was almost eliminated during production. Therefore, simply reducing the α-ray count of high-purity tin in the early stages of production was not a fundamental solution to the problem.

Patent Document 1: JP 3528532 B
Patent Document 2: JP 3227851 B
Patent Document 3: JP 2913908 B
Patent Document 4: JP 2754030 B
Patent Document 5: JP H11-343590 A
Patent Document 6: JP H09-260427 A
Patent Document 7: JP H01-283398 A
Patent Document 8: JP S62-047955 B
Patent Document 9: JP S62-001478 B
Patent Document 10: WO 2007/004394

SUMMARY OF INVENTION

Technical Problem

Since recent semiconductor devices are highly densified and of low operation voltage and cell capacity, there is an increasing risk of soft errors caused by the influence of α rays emitted from materials in the vicinity of semiconductor chips. In particular, there are strong demands for high purification of solder materials or tin for use in the vicinity of semiconductor devices, and demands for materials with lower α rays. Accordingly, an object of the present invention is to clarify the phenomenon of the generation of α (alpha) rays in tin and tin alloys, and to obtain high-purity tin, in which the α dose has been reduced, suitable for the required materials, as well as a method for producing the same.

Solution to Problem

The following invention is provided to solve the above problem.
1) Tin characterized in that a sample of the tin after melting and casting has an α dose of less than 0.0005 cph/cm$^2$.
2) Tin characterized in that the respective α doses of a sample of the tin measured one week, three weeks, one month, two months, six months, and thirty months after melting and casting are less than 0.0005 cph/cm$^2$.
3) Tin characterized in that the first measured α dose of a sample of the tin is less than 0.0002 cph/cm$^2$, and the difference between the first measured α dose and the α dose measured after the elapse of five months from the first measurement is less than 0.0003 cph/cm$^2$.
4) The tin according to 1) or 2), characterized in that the first measured α dose of the sample is less than 0.0002 cph/cm$^2$, and the difference between the first measured α dose and the α dose measured after the elapse of five months from the first measurement is less than 0.0003 cph/cm$^2$.
5) The tin according to any one of 1) to 4), characterized in that the Pb content is 0.1 ppm or less.
6) The tin according to any one of 1) to 3), characterized in that the respective contents of U and Th are 5 ppb or less.
7) A tin alloy comprising 40% or more of the tin according to any one of 1) to 6).
8) A method for producing the tin according to any one of 1) to 6), characterized in that raw material tin having a purity level of 3N is leached in hydrochloric acid or sulfuric acid, and then electrolytic refining is performed using the resulting leachate having a pH of 1.0 or less and an Sn concentration of 200 g/L or less as an electrolyte.
9) The method for producing tin according to 8), characterized in that the electrolysis is performed at an Sn concentration of 30 to 180 g/L.
10) The method for producing tin according to 8) or 9), characterized in that the raw material tin, in which the amount of lead isotope $^{210}$Pb is 30 Bq/kg or less, is used.

Since recent semiconductor devices are highly densified and of low operation voltage and cell capacity, there is an increasing risk of soft errors caused by the influence of α rays emitted from materials in the vicinity of semiconductor chips. However, the present invention has an excellent effect of providing tin and a tin alloy suitable for materials with low α rays. The occurrence of soft errors in semiconductor devices caused by the influence of α rays can be thereby significantly reduced.

DETAILED DESCRIPTION

There are many radioactive elements that generate α rays; however, most of them have very long or very short half-lives, and therefore do not actually cause problems. Actual problems are α (alpha) rays generated during the disintegration of polonium isotope $^{210}$Po to lead isotope $^{206}$Pb in the U disintegration chain (see FIG. 1).

As Pb-free solder materials for semiconductors, Sn—Ag—Cu, Sn—Ag, Sn—Cu, Sn—Zn, etc., have been developed, and there is a demand for low α tin materials. However, it is very difficult to completely remove trace lead contained in tin. Tin materials for semiconductors generally contain lead at a level of 10 ppm or more.

As described above, Po is highly sublimable and sublimates upon heating in the production process, such as melting and casting process. When polonium isotope $^{210}$Po is removed during the production process, it is considered that disintegration of polonium isotope $^{210}$Po to lead isotope $^{206}$Pb does not occur, and α rays are not generated (see the "U disintegration chain" of FIG. 1).

Figure 2:
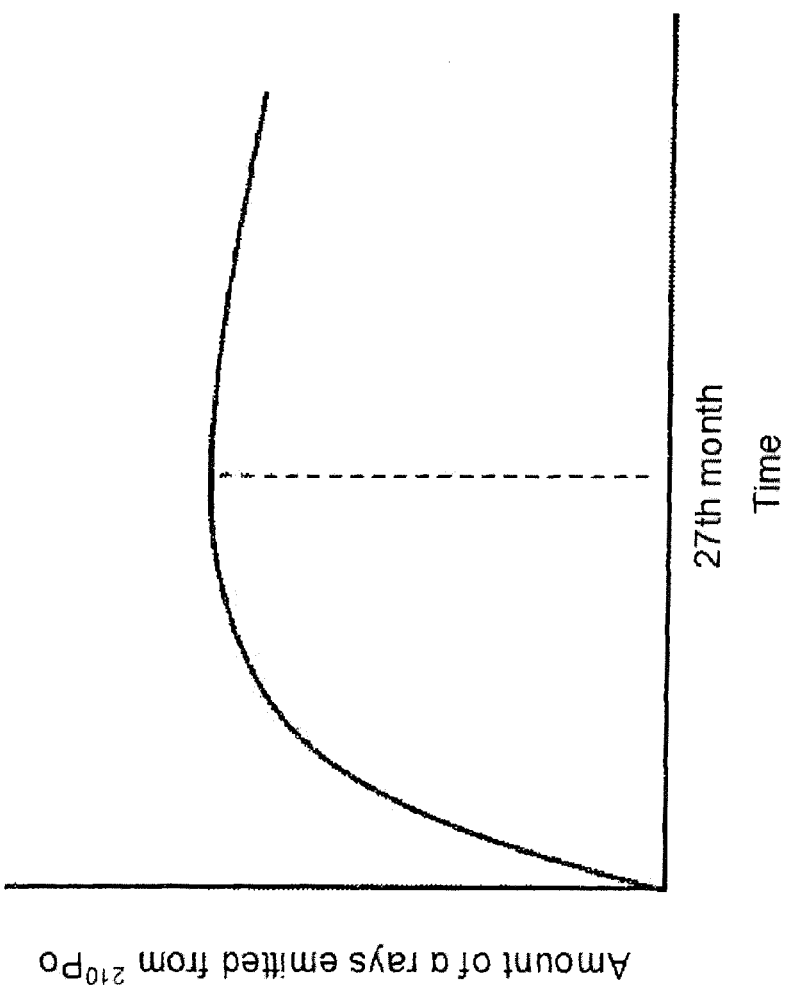
FIG. 2 This shows the amounts of α rays emitted during the reconstruction of the disintegration chain of $^{210}$Pb→$^{210}$Bi→$^{210}$Po→$^{206}$Pb in a state where there is almost no polonium isotope $^{210}$Po.

However, in a state where there is almost no polonium isotope $^{210}$Po, disintegration of $^{210}$Pb→$^{210}$Bi→$^{210}$Po→$^{206}$Pb occurs. It was also found that about 27 months (a little more than two years) were required for the disintegration chain to be brought into a state of equilibrium (see FIG. 2).

More specifically, when the material contains lead isotope $^{210}$Pb (half-life: 22 years), disintegration of $^{210}$Pb→$^{210}$Bi (half-life: 5 days)→$^{210}$Po (half-life: 138 days) (FIG. 1) proceeds over time, and the disintegration chain is reconstructed to produce $^{210}$Po. Thus, α rays are generated by the disintegration of polonium isotope $^{210}$Po to lead isotope $^{206}$Pb.

For this reason, the problem cannot be solved even if the α dose is low immediately after the production of products. The α dose gradually increases over time, causing a problem of increasing the risk of developing soft errors. The aforementioned period of 27 months (a little more than two years) is not short at all.

Figure 1:
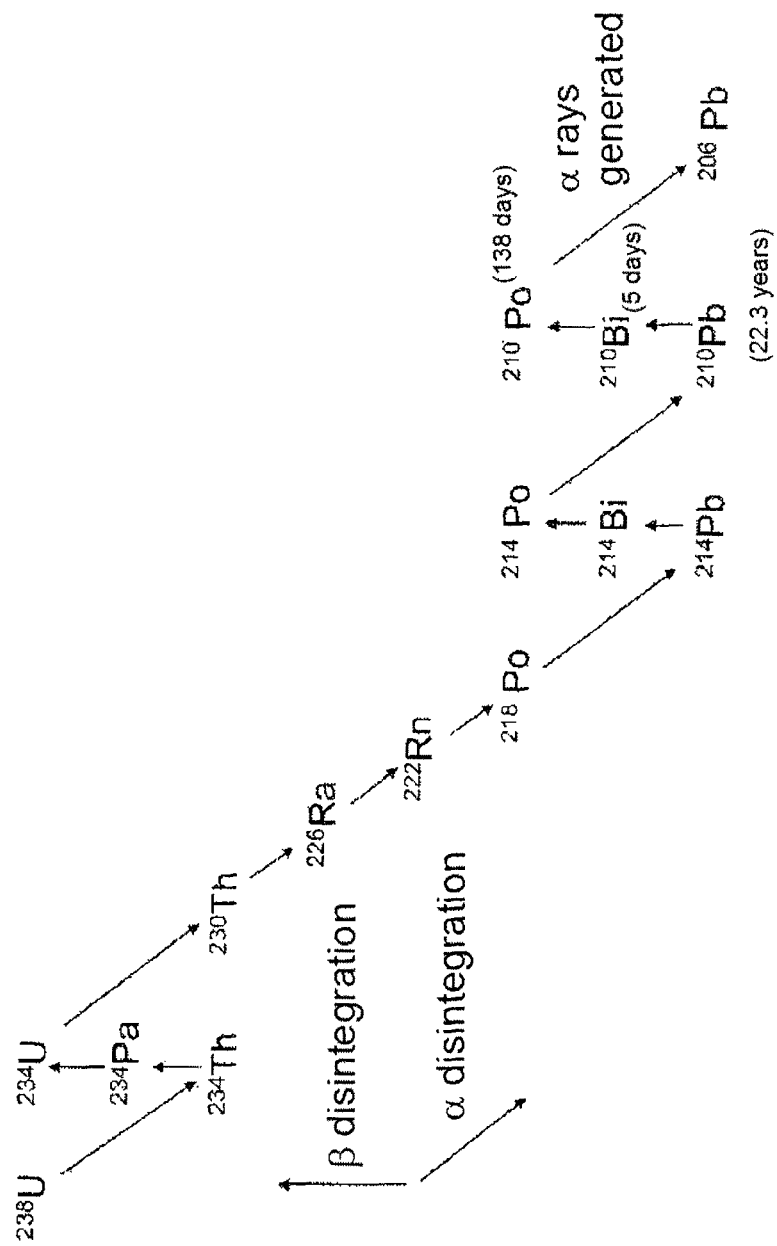
FIG. 1 This shows the disintegration chain of uranium (U) disintegrating into $^{206}$Pb (uranium-radium disintegration series).

The problem that the α dose gradually increases over time in spite of the low α dose immediately after the production of products is attributable to the fact that the material contains lead isotope $^{210}$Pb of the U disintegration chain shown in FIG. 1. It can be said that the above problem cannot be solved unless the content of lead isotope $^{210}$Pb is reduced as much as possible.

Figure 3:
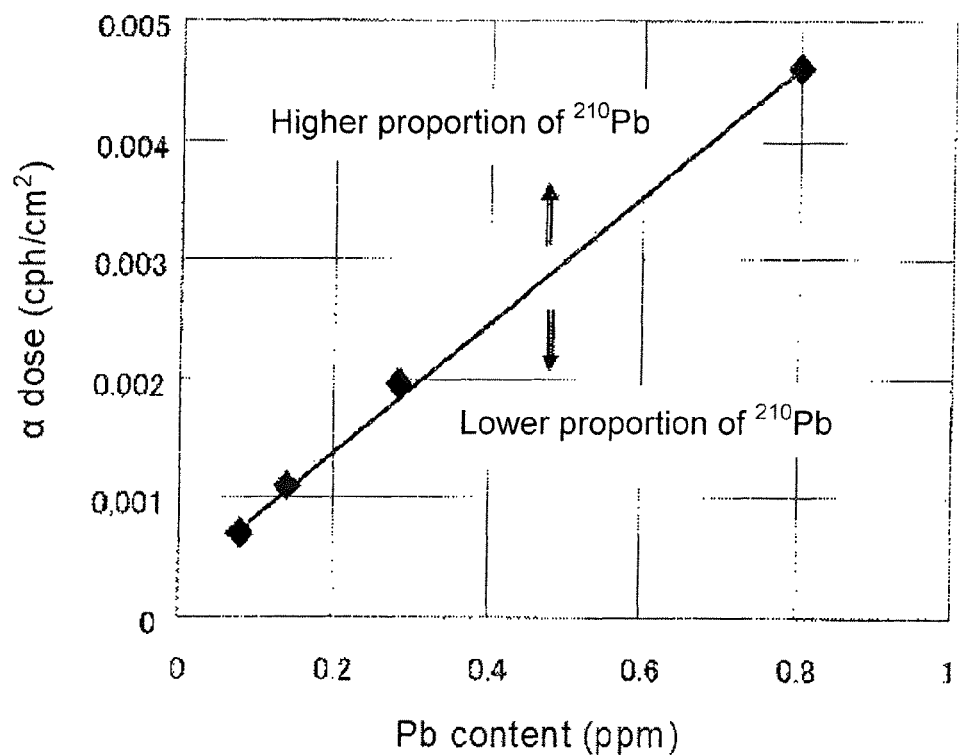
FIG. 3 This shows the relationship between the Pb content and the α dose in Sn.

FIG. 3 shows the relationship between the Pb content and the α dose. It was found that the straight line shown in FIG. 3 shifted up and down depending on the proportion of lead isotopes $^{214}$Pb, $^{210}$Pb, $^{209}$Pb, $^{208}$Pb, $^{207}$Pb, $^{206}$Pb, and $^{204}$Pb, and that the line shifted upwards as the proportion of lead isotope $^{210}$Pb became high. That is, when the amount of lead isotope $^{210}$Pb exceeds 30 Bq/kg, the straight line shown in FIG. 3 moves upwards.

(Analytical Method of $^{210}$Pb and Minimum Determination Limit)

An analysis sample is dissolved in an acid mixture (nitric acid and hydrochloric acid), and then lead and a calcium carrier are added. A hydroxide precipitate is formed by using an ammonia solution, and tin is removed. An ammonia solution and sodium carbonate are placed in the supernatant to form a carbonate precipitate. The precipitate is dissolved in hydrochloric acid, and passed through an Sr resin column. Nitric acid is added to the eluate to form a sulfate precipitate, and the sulfate precipitate is mounted to obtain a measurement sample. The measurement sample is covered with an aluminum plate (27 mg/cm$^2$), and is allowed to stand for two weeks or more. Thereafter, β (beta) rays of $^{210}$Bi produced from $^{210}$Pb are measured for 6,000 seconds by a low-background β-ray measuring device. The net counting rate of the measurement sample is determined, and correction of counting efficiency, chemical recovery rate, etc., is performed, thereby calculating the radioactive concentration of $^{210}$Pb. The measuring devices used were low-background β-ray measuring devices LBC-471Q and LBC-4201 (produced by Aloka Co., Ltd.). The minimum detection limit of the radioactive concentration of $^{210}$Pb is set as "the minimum radioactive value that can be reliably detected" for the nuclide targeted for analysis when analytical and measuring conditions (the amount of measurement sample, chemical recovery rate, measurement time, counting efficiency, etc.) are determined.

From the above, it is important to reduce the proportion of lead isotope $^{210}$Pb in tin. Since the reduction of Pb to 0.1 ppm or less consequently results in the reduction of lead isotope $^{210}$Pb, the α dose does not increase over time.

Furthermore, the lower abundance ratio of lead isotope $^{206}$Pb implies that the ratio of U disintegration chain shown in FIG. 1 is relatively low. It is considered that lead isotope $^{210}$Pb belonging to this system also decreases.

Thereby, the melted and cast tin can achieve an α (alpha) dose of less than 0.0005 cph/cm$^2$. This level of a dose forms the basis of the present invention. None of the prior art documents suggests or indicates that the above level of α dose is achieved with such recognition. Specifically, the present invention provides a tin metal giving an α-dose of less than 0.0005 cph/cm$^2$ measured at an elapsed time of one week, three weeks, one month, two months, six months, or thirty months after the melting and casting, the time elapse of thirty months being longer than a time elapse of 27 months which is needed for the disintegration chain of $^{210}$Pb→$^{210}$Bi→$^{210}$Po→$^{206}$Pb to reach an equilibrium state starting from a state containing $^{210}$Po isotope with α-ray radiation.

Additionally, the present invention can make the difference between the measured α dose of a sample of the melted and cast tin and the α dose of the sample after five months to be less than 0.0003 cph/cm$^2$. To reduce the above α dose, the abundance ratio of lead isotope $^{206}$Pb is desirably less than 25% in the raw material tin. The abundance ratio of lead isotope $^{206}$Pb as used herein refers to the proportion of $^{206}$Pb among four stable lead isotopes $^{208}$Pb, $^{207}$Pb, $^{206}$Pb, and $^{204}$Pb.

In this case, the initial (first) measurement of α dose of a tin sample does not only refer to the measurement of α dose of a tin sample immediately after melting and casting. More specifically, the difference between the measured α dose, regardless of when the α dose of the tin sample is measured, and the α dose measured five months later is less than 0.0003 cph/cm$^2$. Needless to say, it will be easily understood that it is not denied that the initial measurement of the α dose includes the measurement of the α dose of the tin sample immediately after melting and casting.

Furthermore, the measurement of α dose may require attention to α rays emitted from the α-ray measuring device (equipment) (hereafter, the term "background (BG) α rays" is used, as necessary). The above α dose in the present invention is a substantial amount of α rays excluding α rays emitted from the α-ray measuring device. The term "α dose" described in this specification is used in this sense.

While the above describes the α dose generated from tin, tin-containing alloys are also strongly affected by the α dose. The influence of the α dose may be relieved by components (other than tin) that have a less α dose or hardly produce α rays. However, in the case of a tin alloy comprising at least 40% or more of tin in the alloy contents, it is desirable to use the tin of the present invention, which has a low α dose.

Generally, refining of tin is carried out by a distillation method or an electrolytic method. In the distillation method, however, it is necessary to repeat distillation over and over. Further, when there is an azeotrope, it is difficult to perform isolation and refining, and lead cannot be reduced to a level of 1 ppm or less.

Moreover, the electrolytic method uses an electrolyte prepared by mixing hexafluorosilicate and acid, and adding additives, such as glue, thereto. However, it is difficult to separate tin and lead because their normal electrode potentials are very close to each other (tin: −0.14 V, lead: −0.13 V). Further, the hexafluorosilicate, glue, and other additives may cause lead contamination, and there is a limitation to reduction of lead only to a level of several 10 ppm.

The present invention allows removal of lead to a level of 0.1 ppm by controlling the pH (pH range of strong acid) and the tin concentration in an electrolyte comprising only acid and being free from hexafluorosilicate and additives.

The high-purity tin of the present invention obtained in this manner has an excellent effect of significantly reducing the occurrence of soft errors in the semiconductor device caused by the influence of α rays.

When tin is produced by the above electrolysis, the Sn concentration of the electrolyte is desirably 30 to 200 g/L. When the Sn concentration is less than 30 g/L, the impurity concentration becomes high; whereas when the Sn concentration is higher than 200 g/L, Sn oxide tends to precipitate. Therefore, the Sn concentration is desirably within the above-mentioned range. The upper limit of the Sn concentration is more preferably 180 g/L or less. It is further desirable to use raw material tin in which the amount of lead isotope $^{210}$Pb is 30 Bq/kg or less. Although raw material tin containing lead isotope $^{210}$Pb in an amount more than this range can also be used, it is desirable to enhance the refining effect to reduce the amount of lead isotope $^{210}$Pb as much as possible.

EXAMPLES

Next, Examples of the present invention are described. The following Examples are merely illustrative, and the present invention is not limited thereto. That is, embodiments other than the Examples or modifications are all included within the scope of the technical idea of the present invention.

The raw material tins shown in Table 1 were used in the following Examples and Comparative Examples. Table 1 shows the type of raw material tin and the amount of lead isotope $^{210}$Pb contained in each of the raw materials A to E (unit: Bq/kg).

TABLE 1

| Type of Raw Material Tin | Amount of Lead Isotope $^{210}$Pb (Bq/kg) |
|---|---|
| Raw Material A | 14 |
| Raw Material B | 15 |
| Raw Material C | 48 ± 6.2 |
| Raw Material D | 60 ± 7.2 |
| Raw Material E | 24 |

Example 1

Raw material tin with a purity level of 3N was leached in hydrochloric acid (or sulfuric acid), and the resulting leachate having a pH of 1.0 and an Sn concentration of 80 g/L was used as an electrolyte. Using a tin plate obtained by casting raw material tin as the anode, and a titanium plate as the cathode, electrolysis was carried out under conditions where the electrolysis temperature was 30° C., and the current density was 7 A/dm$^2$.

When the thickness of the tin electrodeposited on the cathode reached about 2 mm, the electrolysis was halted, and the cathode was taken out from the electrolytic cell. The electrodeposited tin was collected by being removed from the cathode. After the collection, the cathode was returned to the electrolytic cell, and the electrolysis was started again. This operation was repeated. The collected electrodeposited tin was washed and dried, and melted and cast at a temperature of 260° C. to obtain a tin ingot.

The tin ingot was subject to rolling to a thickness of about 1.5 mm, and cut into a square (310 mm×310 mm). Its surface area was 961 cm$^2$. This was used as a sample for measurement of α rays.

In this sample, the Pb content was 0.06 ppm, the U content was less than 5 ppb, and the Th content was less than 5 ppb.

Moreover, the amount of unstable lead isotope $^{210}$Pb was 14 Bq/kg in the raw material tin (raw material A) used herein. The total amount of four stable lead isotopes was 1.81 ppm, and the abundance ratio of stable lead isotope $^{206}$Pb was 24.86%. The abundance ratio of lead isotope $^{206}$Pb as used herein indicates that the proportion of $^{206}$Pb among four lead isotopes $^{208}$Pb, $^{207}$Pb, $^{206}$Pb, and $^{204}$Pb. The same applies to the following Examples.

The α-ray measuring device used was an ORDELA Model 8600 A-LB gas flow proportional counter. The gases used were 90% argon and 10% methane. The measurement time for both the background and sample was 104 hours. The initial four hours were regarded as the time required for purging the measurement chamber, and the data between 5 to 104 hours after the start of measurement was used for the calculation of the α dose.

As a result of measuring the α dose of the above sample one week, three weeks, one month, two months, and six months after melting and casting, and thirty months being beyond 27 months in which the disintegration chain of $^{210}$Pb→$^{210}$Bi→$^{210}$Po→$^{206}$Pb was brought into a state of equilibrium when there was no polonium isotope $^{210}$Po producing α rays by the disintegration to lead isotope $^{206}$Pb; the α dose was at a maximum of 0.0003 cph/cm$^2$, which satisfied the requirements of the present invention.

Moreover, when α dose changes of the same sample in five months (between the first month and the sixth month) were observed, the difference in α dose of the sample was 0.0001 cph/cm$^2$, which satisfied the requirements of the present invention. As described above, the measured α dose was a substantial amount of α rays excluding α rays emitted from the α-ray measuring device. The same applies to the following Examples.

In this Example, the leachate having a pH of 1.0 and an Sn concentration of 80 g/L was used as an electrolyte; however, almost similar results were obtained when electrolytic refining was performed under different electrolyte conditions (Sn concentration) using a leachate having a pH of 1.0 and an Sn concentration of 30 g/L or a leachate having a pH of 1.0 and an Sn concentration of 180 g/L.

Example 2

Raw material tin with a purity level of 3N was leached in hydrochloric acid (or sulfuric acid), and the resulting leachate having a pH of 1.0 and an Sn concentration of 80 g/L was used as an electrolyte. Using a tin plate obtained by casting raw material tin as the anode, and a titanium plate as the cathode, electrolysis was carried out under conditions where the electrolysis temperature was 30° C., and the current density was 1 A/dm$^2$.

When the thickness of the tin electrodeposited on the cathode reached about 2 mm, the electrolysis was halted, and the cathode was taken out from the electrolytic cell. The electrodeposited tin was collected by being removed from the cathode. After the collection, the cathode was returned to the electrolytic cell, and the electrolysis was started again. This operation was repeated. The collected electrodeposited tin was washed and dried, and melted and cast at a temperature of 260° C. to obtain a tin ingot.

The tin ingot was subject to rolling to a thickness of about 1.5 mm, and cut into a square (310 mm×310 mm). Its surface area was 961 cm$^2$. This was used as a sample for measurement of α rays.

In this sample, the Pb content was 0.07 ppm, the U content was less than 5 ppb, and the Th content was less than 5 ppb.

Moreover, the amount of unstable lead isotope $^{210}$Pb was 14 Bq/kg in the raw material tin (raw material A, same as the raw material of Example 1) used herein. The total amount of four stable lead isotopes was 1.81 ppm, and the abundance ratio of stable lead isotope $^{206}$Pb was 24.86%.

As a result of measuring the α dose of the above sample one week, three weeks, one month, two months, and six months after melting and casting, and thirty months being beyond 27 months in which the disintegration chain of $^{210}$Pb→$^{210}$Bi→$^{210}$Po→$^{206}$Pb was brought into a state of equilibrium when there was no polonium isotope $^{210}$Po producing α rays by the disintegration to lead isotope $^{206}$Pb, the α dose was at a maximum of 0.0003 cph/cm$^2$, which satisfied the requirements of the present invention.

Moreover, when α dose changes of the same sample in five months (between the first month and the sixth month) were observed, the difference in α dose of the sample was 0.0001 cph/cm$^2$, which satisfied the requirements of the present invention.

In this Example, the leachate having a pH of 1.0 and an Sn concentration of 80 g/L was used as an electrolyte; however, almost similar results were obtained when electrolytic refining was performed under different electrolyte conditions (Sn concentration) using a leachate having a pH of 1.0 and an Sn concentration of 30 g/L or a leachate having a pH of 1.0 and an Sn concentration of 180 g/L.

Example 3

Raw material tin with a purity level of 3N was leached in hydrochloric acid (or sulfuric acid), and the resulting leachate having a pH of 1.0 and an Sn concentration of 80 g/L was used as an electrolyte.

Using a tin plate obtained by casting raw material tin as the anode, and a titanium plate as the cathode, electrolysis was carried out under conditions where the electrolysis temperature was 30° C., and the current density was 1 A/dm$^2$.

When the thickness of the tin electrodeposited on the cathode reached about 2 mm, the electrolysis was halted, and the cathode was taken out from the electrolytic cell. The electrodeposited tin was collected by being removed from the cathode. After the collection, the cathode was returned to the electrolytic cell, and the electrolysis was started again. This operation was repeated. The collected electrodeposited tin was washed and dried, and melted and cast at a temperature of 260° C. to obtain a tin ingot.

The tin ingot was subject to rolling to a thickness of about 1.5 mm, and cut into a square (310 mm×310 mm). Its surface area was 961 cm$^2$. This was used as a sample for measurement of α rays.

In this sample, the Pb content was 0.05 ppm, the U content was less than 5 ppb, and the Th content was less than 5 ppb. Moreover, the amount of unstable lead isotope $^{210}$Pb was 15 Bq/kg in the raw material tin (raw material B) used herein. The total amount of four stable lead isotopes was 3.8 ppm, and the abundance ratio of stable lead isotope $^{206}$Pb was 24.74%.

As a result of measuring the α dose of the above sample one week, three weeks, one month, two months, and six months after melting and casting, and thirty months being beyond 27 months in which the disintegration chain of $^{210}$Pb→$^{210}$Bi→$^{210}$Po→$^{206}$Pb was brought into a state of equilibrium when there was no polonium isotope $^{210}$Po producing α rays by the disintegration to lead isotope $^{206}$Pb; the α dose was at a maximum of 0.0002 cph/cm$^2$, which satisfied the requirements of the present invention.

Moreover, when α dose changes of the same sample in five months (between the first month and the sixth month) were observed, the difference in α dose of the sample was 0.0001 cph/cm$^2$, which satisfied the requirements of the present invention.

In this Example, the leachate having a pH of 1.0 and an Sn concentration of 80 g/L was used as an electrolyte; however, almost similar results were obtained when electrolytic refining was performed under different electrolyte conditions (Sn concentration) using a leachate having a pH of 1.0 and an Sn concentration of 30 g/L or a leachate having a pH of 1.0 and an Sn concentration of 180 g/L.

Example 4

Raw material tin with a purity level of 3N was leached in hydrochloric acid (or sulfuric acid), and the resulting leachate having a pH of 1.0 and an Sn concentration of 80 g/L was used as an electrolyte. Using a tin plate obtained by casting raw material tin as the anode, and a titanium plate as the cathode, electrolysis was carried out twice under conditions where the electrolysis temperature was 30° C., and the current density was 7 A/dm$^2$. That is, this process is to perform electrolysis again (second electrolysis) using, as the anode, a tin plate obtained by subjecting the electrodeposited tin, which was collected by the first electrolysis, to melting and casting.

In the above electrolysis process, when the thickness of the tin electrodeposited on the cathode reached about 2 mm, the electrolysis was halted, and the cathode was taken out from the electrolytic cell. The electrodeposited tin was collected by being removed from the cathode. After the collection, the cathode was returned to the electrolytic cell, and the electrolysis was started again. This operation was repeated. The collected electrodeposited tin was washed and dried, and melted and cast at a temperature of 260° C. to obtain a tin ingot.

The tin ingot was subject to rolling to a thickness of about 1.5 mm, and cut into a square (310 mm×310 mm). Its surface area was 961 cm$^2$. This was used as a sample for measurement of α rays.

In this sample, the Pb content was 0.06 ppm, the U content was less than 5 ppb, and the Th content was less than 5 ppb. Moreover, the amount of unstable lead isotope $^{210}$Pb was 48±6.2 Bq/kg in the raw material tin (raw material C) used herein. The total amount of four stable lead isotopes was 11.55 ppm, and the abundance ratio of stable lead isotope $^{206}$Pb was 25.97%.

As a result of measuring the α dose of the above sample one week, three weeks, one month, two months, and six months after melting and casting, and thirty months being beyond 27 months in which the disintegration chain of $^{210}$Pb→$^{210}$Bi→$^{210}$Po→$^{206}$Pb was brought into a state of equilibrium when there was no polonium isotope $^{210}$Po producing α rays by the disintegration to lead isotope $^{206}$Pb; the α dose was at a maximum of less than 0.0005 cph/cm$^2$, which satisfied the requirements of the present invention.

Moreover, when α dose changes of the same sample in five months (between the first month and the sixth month) were observed, the difference in α dose of the sample was 0.0002 cph/cm$^2$, which satisfied the requirements of the present invention. In this Example, the leachate having a pH of 1.0 and an Sn concentration of 80 g/L was used as an electrolyte; however, almost similar results were obtained when electrolytic refining was performed under different electrolyte conditions (Sn concentration) using a leachate having a pH of 1.0 and an Sn concentration of 30 g/L or a leachate having a pH of 1.0 and an Sn concentration of 180 g/L.

Example 5

Raw material tin with a purity level of 3N was leached in hydrochloric acid (or sulfuric acid), and the resulting leachate having a pH of 1.0 and an Sn concentration of 80 g/L was used as an electrolyte. Using a tin plate obtained by casting raw material tin as the anode, and a titanium plate as the cathode, electrolysis was carried out under conditions where the electrolysis temperature was 30° C., and the current density was 7 A/dm$^2$.

When the thickness of the tin electrodeposited on the cathode reached about 2 mm, the electrolysis was halted, and the cathode was taken out from the electrolytic cell. The electrodeposited tin was collected by being removed from the cathode. After the collection, the cathode was returned to the electrolytic cell, and the electrolysis was started again. This operation was repeated. The collected electrodeposited tin was washed and dried, and melted and cast at a temperature of 260° C. to obtain a tin ingot.

The tin ingot was subject to rolling to a thickness of about 1.5 mm, and cut into a square (310 mm×310 mm). Its surface area was 961 cm$^2$. This was used as a sample for measurement of α rays.

In this sample, the Pb content was 0.06 ppm, the U content was less than 5 ppb, and the Th content was less than 5 ppb.

Moreover, the amount of unstable lead isotope $^{210}$Pb was 24 Bq/kg in the raw material tin (raw material E) used herein. The total amount of four stable lead isotopes was 4.5 ppm, and the abundance ratio of stable lead isotope $^{266}$Pb was 22.22%.

As a result of measuring the α dose of the above sample one week, three weeks, one month, two months, and six months after melting and casting, and thirty months being beyond 27 months in which the disintegration chain of $^{210}$Pb→$^{210}$Bi→$^{210}$Po→$^{206}$Pb was brought into a state of equilibrium when there was no polonium isotope $^{210}$Po producing α rays by the disintegration to lead isotope $^{206}$Pb; the α dose was at a maximum of 0.0005 cph/cm$^2$, which satisfied the requirements of the present invention.

Moreover, when α dose changes of the same sample in five months (between the first month and the sixth month) were observed, the difference in α dose of the sample was 0.0002 cph/cm$^2$, which satisfied the requirements of the present invention.

In this Example, the leachate having a pH of 1.0 and an Sn concentration of 80 g/L was used as an electrolyte; however, almost similar results were obtained when electrolytic refining was performed under different electrolyte conditions (Sn concentration) using a leachate having a pH of 1.0 and an Sn concentration of 30 g/L or a leachate having a pH of 1.0 and an Sn concentration of 180 g/L.

Comparative Example 1

Raw material tin with a purity level of 3N was leached in hydrochloric acid (or sulfuric acid), and the resulting leachate having a pH of 1.0 and an Sn concentration of 80 g/L was used as an electrolyte.

Using a tin plate obtained by casting raw material tin as the anode, and a titanium plate as the cathode, electrolysis was carried out under conditions where the electrolysis temperature was 30° C., and the current density was 7 A/dm$^2$.

When the thickness of the tin electrodeposited on the cathode reached about 2 mm, the electrolysis was halted, and the cathode was taken out from the electrolytic cell. The electrodeposited tin was collected by being removed from the cathode. After the collection, the cathode was returned to the electrolytic cell, and the electrolysis was started again. This operation was repeated. The collected electrodeposited tin was washed and dried, and melted and cast at a temperature of 260° C. to obtain a tin ingot.

The tin ingot was subject to rolling to a thickness of about 1.5 mm, and cut into a square (310 mm×310 mm). Its surface area was 961 cm$^2$. This was used as a sample for measurement of α rays.

In this sample, the Pb content was 0.07 ppm, the U content was less than 5 ppb, and the Th content was less than 5 ppb.

Moreover, the amount of unstable lead isotope $^{210}$Pb was 60±7.2 Bq/kg in the raw material tin (raw material D) used herein. The total amount of four stable lead isotopes was 12.77 ppm, and the abundance ratio of stable lead isotope $^{206}$Pb was 25.06%.

The α dose of the above sample three weeks after melting and casting was the same level as the background (BG) α dose. However, the α dose six months after melting and casting clearly increased, and the α dose of the sample (the difference from the background α dose) was 0.02 cph/cm$^2$, which did not satisfy the requirements of the present invention.

The reason for this is considered to be that: the α dose was temporarily reduced because of sublimation of Po during the melting and casting process; but the purification effect was not sufficient, the Pb content was high, and the $^{210}$Pb content was consequently also high; and therefore the disintegration chain ($^{210}$Pb→$^{210}$Bi→$^{210}$Po→$^{206}$Pb) was reconstructed to increase the α dose.

Moreover, when α dose changes of the same sample in five months (between the first month and the sixth month) were observed, the difference in α dose of the sample was 0.007 cph/cm$^2$, which did not satisfy the requirements of the present invention.

Comparative Example 2

Raw material tin with a purity level of 3N was leached in hydrochloric acid (or sulfuric acid), and the resulting leachate having a pH of 1.0 and an Sn concentration of 80 g/L was used as an electrolyte.

Using a tin plate obtained by casting raw material tin as the anode, and a titanium plate as the cathode, electrolysis was carried out under conditions where the electrolysis temperature was 30° C., and the current density was 7 A/dm$^2$.

When the thickness of the tin electrodeposited on the cathode reached about 2 mm, the electrolysis was halted, and the cathode was taken out from the electrolytic cell. The electrodeposited tin was collected by being removed from the cathode. After the collection, the cathode was returned to the electrolytic cell, and the electrolysis was started again. This operation was repeated. The collected electrodeposited tin was washed and dried, and melted and cast at a temperature of 260° C. to obtain a tin ingot.

The tin ingot was subject to rolling to a thickness of about 1.5 mm, and cut into a square (310 mm×310 mm). Its surface area was 961 cm$^2$. This was used as a sample for measurement of α rays.

In this sample, the Pb content was 0.09 ppm, the U content was less than 5 ppb, and the Th content was less than 5 ppb.

Moreover, the amount of unstable lead isotope $^{210}$Pb was 48±6.2 Bq/kg in the raw material tin (raw material C, same as the raw material of Example 4) used herein. The total amount of four stable lead isotopes was 11.55 ppm, and the abundance ratio of stable lead isotope $^{206}$Pb was 25.97%.

The α dose of the above sample three weeks after melting and casting was the same level as the background (BG) α dose. However, the α dose six months after melting and casting clearly increased, and the α dose of the sample (the difference from the background α dose) was 0.01 cph/cm$^2$, which did not satisfy the requirements of the present invention.

The reason for this is considered to be that: the α dose was temporarily reduced because of sublimation of Po during the melting and casting process; but the purification effect was not sufficient, the Pb content was high, and the $^{210}$Pb content was consequently also high; and therefore the disintegration chain ($^{210}$Pb→$^{210}$Bi→$^{210}$Po→$^{206}$Pb) was reconstructed to increase the α dose.

Moreover, when α dose changes of the same sample in five months (between the first month and the sixth month) were observed, the difference in α dose of the sample was 0.007 cph/cm$^2$, which did not satisfy the requirements of the present invention.

Comparative Example 3

Tin containing 4 ppm of Pb was melted and cast at a temperature of 260° C. to obtain a tin ingot. The tin ingot was subject to rolling to a thickness of about 1.5 mm, and cut into a square (310 mm×310 mm). Its surface area was 961 cm². This was used as a sample for measurement of α rays.

In this sample, the Pb content was 4 ppm, the U content was less than 5 ppb, and the Th content was less than 5 ppb.

Moreover, in the raw material tin (material obtained by mixing the raw material B used in Example 3 and the tin produced in Example 3) used herein, the total amount of four stable lead isotopes was 3.9 ppm, and the abundance ratio of stable lead isotope $^{206}$Pb was 25%.

The α dose of the above sample three weeks after melting and casting was the same level as the background (BG) α dose. However, the α dose six months after melting and casting clearly increased, and the α dose of the sample (the difference from the background α dose) was 0.0008 cph/cm², which did not satisfy the requirements of the present invention.

The reason for this is considered to be that: the α dose was temporarily reduced because of sublimation of Po during the melting and casting process; but the purification effect was not sufficient, the Pb content was high, and the $^{210}$Pb content was consequently also high; and therefore the disintegration chain ($^{210}$Pb→$^{210}$Bi→$^{210}$Po→$^{206}$Pb) was reconstructed to increase the α dose.

Moreover, when α dose changes of the same sample in five months (between the first month and the sixth month) were observed, the difference in α dose of the sample was 0.0004 cph/cm², which also did not satisfy the requirements of the present invention.

Comparative Example 4

Raw material tin with a purity level of 3N was leached in hydrochloric acid (or sulfuric acid), and mixed with hexafluorosilicate and acid. The resulting leachate having an Sn concentration of 50 g/L was used as an electrolyte.

Using a tin plate obtained by casting raw material tin as the anode, and a titanium plate as the cathode, electrolysis was carried out under conditions where the electrolysis temperature was 20° C., and the current density was 1 A/dm².

When the thickness of the tin electrodeposited on the cathode reached about 2 mm, the electrolysis was halted, and the cathode was taken out from the electrolytic cell. The electrodeposited tin was collected by being removed from the cathode. After the collection, the cathode was returned to the electrolytic cell, and the electrolysis was started again. This operation was repeated.

The collected electrodeposited tin was washed and dried, and melted and cast at a temperature of 260° C. to obtain a tin ingot. The tin ingot was subject to rolling to a thickness of about 1.5 mm, and cut into a square (310 mm×310 mm). Its surface area was 961 cm². This was used as a sample for measurement of α rays.

In this sample, the Pb content was 0.7 ppm, the U content was less than 5 ppb, and the Th content was less than 5 ppb.

Moreover, the amount of unstable lead isotope $^{210}$Pb was 14 Bq/kg in the raw material tin (raw material A, same as the raw material of Example 1) used herein. The total amount of four stable lead isotopes was 1.81 ppm, and the abundance ratio of stable lead isotope $^{206}$Pb was 24.86%.

The α dose of the above sample three weeks after melting and casting was the same level as the background (BG) α dose. However, the α dose six months after melting and casting clearly increased, and the α dose of the sample (the difference from the background α dose) was 0.0003 cph/cm², which did not satisfy the requirements of the present invention.

The reason for this is considered to be that: the α dose was temporarily reduced because of sublimation of Po during the melting and casting process; but the purification effect was not sufficient, the Pb content was high, and the $^{210}$Pb content was consequently also high; and therefore the disintegration chain ($^{210}$Pb→$^{210}$Bi→$^{210}$Po→$^{206}$Pb)) was reconstructed to increase the α dose.

Moreover, when α dose changes of the same sample in five months (between the first month and the sixth month) were observed, the difference in α dose of the sample was 0.0003 cph/cm², which also did not satisfy the requirements of the present invention.

Example 5

Tin Alloy Comprising 0.5% Cu, 3% Ag, and Balance Sn

The tin produced in Example 1 was prepared. The additive elements of the tin alloy of this Example were 6N—Ag and 6N—Cu, which were prepared by highly purifying the commercially available silver and copper by electrolysis. These elements were added to the above tin, and melted and cast at 260° C., thereby producing an Sn—Cu—Ag alloy ingot comprising 0.5% Cu, 3% Ag, and the balance Sn.

The tin ingot was subject to rolling to a thickness of about 1.5 mm, and cut into a square (310 mm×310 mm). Its surface area was 961 cm². This was used as a sample for measurement of α rays.

In this sample, the Pb content was 0.06 ppm, the U content was less than 5 ppb, and the Th content was less than 5 ppb.

As a result of measuring the α dose of the above sample one week, three weeks, one month, two months, and six months after melting and casting, and thirty months being beyond 27 months in which the disintegration chain of $^{210}$Pb→$^{210}$Bi→$^{210}$Po→$^{206}$Pb was brought into a state of equilibrium when there was no polonium isotope $^{210}$Po producing α rays by the disintegration to lead isotope $^{206}$Pb; the α dose was at a maximum of 0.0003 cph/cm², which satisfied the requirements of the present invention.

Moreover, when α dose changes of the same sample in five months (between the first month and the sixth month) were observed, the difference in α dose of the sample was 0.0001 cph/cm², which satisfied the requirements of the present invention.

Example 6

Tin Alloy Comprising 3.5% Ag and Balance Sn

The tin produced in Example 1 was prepared. The additive element of the tin alloy of this Example was high-purity silver, which was prepared by dissolving the commercially available Ag with nitric acid, adding HCl thereto to precipitate AgCl, and further subjecting the precipitated AgCl to hydrogen reduction, thereby obtaining high-purity Ag (5N—Ag). This element was added to the above tin, and melted and cast at 260° C., thereby producing an Sn—Ag alloy ingot comprising 3.5% Ag and the balance Sn.

The tin ingot was subject to rolling to a thickness of about 1.5 mm, and cut into a square (310 mm×310 mm). Its surface area was 961 cm². This was used as a sample for measurement of α rays.

In this sample, the Pb content was 0.06 ppm, the U content was less than 5 ppb, and the Th content was less than 5 ppb.

As a result of measuring the α dose of the above sample one week, three weeks, one month, two months, and six months after melting and casting, and thirty months being beyond 27 months in which the disintegration chain of $^{210}$Pb→$^{210}$Bi→$^{210}$Po→$^{206}$Pb was brought into a state of equilibrium when there was no polonium isotope $^{210}$Po producing α rays by the disintegration to lead isotope $^{206}$Pb; the α dose was at a maximum of 0.0003 cph/cm$^2$, which satisfied the requirements of the present invention. Moreover, when α dose changes of the same sample in five months (between the first month and the sixth month) were observed, the difference in α dose of the sample was 0.0001 cph/cm$^2$, which satisfied the requirements of the present invention.

Example 7

Tin Alloy Comprising 9% Zn and Balance Sn

The tin produced in Example 1 was prepared. The additive element of the tin alloy of this Example was 6N—Zn, which was prepared by highly purifying the commercially available zinc by electrolysis. This element was added to the above tin, and melted and cast at 240° C., thereby producing an Sn—Zn alloy ingot comprising 9% Zn and the balance Sn. The tin ingot was subject to rolling to a thickness of about 1.5 mm, and cut into a square (310 mm×310 mm). Its surface area was 961 cm$^2$. This was used as a sample for measurement of α rays. In this sample, the Pb content was 0.06 ppm, the U content was less than 5 ppb, and the Th content was less than 5 ppb.

As a result of measuring the α dose of the above sample one week, three weeks, one month, two months, and six months after melting and casting, and thirty months being beyond 27 months in which the disintegration chain of $^{210}$Pb→$^{210}$Bi→$^{210}$Po→$^{206}$Pb was brought into a state of equilibrium when there was no polonium isotope $^{210}$Po producing α rays by the disintegration to lead isotope $^{266}$Pb, the α dose was at a maximum of 0.0003 cph/cm$^2$, which satisfied the requirements of the present invention. Moreover, when α dose changes of the same sample in five months (between the first month and the sixth month) were observed, the difference in α dose of the sample was 0.0001 cph/cm$^2$, which satisfied the requirements of the present invention.

Comparative Example 5

Tin Alloy Comprising 0.5% Cu, 3% Ag, and Balance Sn

The tin produced in Example 1 was prepared. The additive elements of the tin alloy of this Comparative Example were the commercially available 3N-level silver and copper. These elements were added to the above tin, and melted and cast at 260° C., thereby producing an Sn—Cu—Ag alloy ingot comprising 0.5% Cu, 3% Ag, and the balance Sn. In this sample, the Pb content was 7.1 ppm, the U content was 10 ppb, and the Th content was 10 ppb.

The α dose of the above sample three weeks after melting and casting was the same level as the background α dose. However, the α dose six months after melting and casting clearly increased, and the α dose of the sample (the difference from the background α dose) was 0.1 cph/cm$^2$, which did not satisfy the requirements of the present invention.

Moreover, when α dose changes of the same sample in five months (between the first month and the sixth month) were observed, the difference in α dose of the sample was 0.005 cph/cm$^2$, which also did not satisfy the requirements of the present invention.

The reason for this is considered to be that: the α dose was temporarily reduced because of sublimation of Po during the melting and casting process; but the Pb content was high, and the $^{210}$Pb content was consequently also high; and therefore the disintegration chain ($^{210}$Pb→$^{210}$Bi→$^{210}$Po→$^{206}$Pb) was reconstructed to increase the α dose.

Comparative Example 6

Tin Alloy Comprising 3.5% Ag and Balance Sn

The tin produced in Example 1 was prepared. The additive element of the tin alloy of this Comparative Example was the commercially available 3N-level Ag. This element was added to the above tin, and melted and cast at 260° C., thereby producing an Sn—Ag alloy ingot comprising 3.5% Ag and the balance Sn.

In this sample, the Pb content was 5.3 ppm, the U content was 7 ppb, and the Th content was 6 ppb.

The α dose of the above sample three weeks after melting and casting was the same level as the background α dose. However, the α dose six months after melting and casting clearly increased, and the α dose of the sample (the difference from the background α dose) was 0.03 cph/cm$^2$, which did not satisfy the requirements of the present invention.

Moreover, when α dose changes of the same sample in five months (between the first month and the sixth month) were observed, the difference in α dose of the sample was 0.002 cph/cm$^2$, which also did not satisfy the requirements of the present invention.

The reason for this is considered to be that: the α dose was temporarily reduced because of sublimation of Po during the melting and casting process; but the Pb content was high, and the $^{210}$Pb content was consequently also high; and therefore the disintegration chain ($^{210}$Pb→$^{210}$Bi→$^{210}$Po→$^{206}$Pb) was reconstructed to increase the α dose.

Comparative Example 7

Tin Alloy Comprising 9% Zn and Balance Sn

The tin produced in Example 1 was prepared. The additive element of the tin alloy of this Comparative Example was the commercially available 3N-level zinc. This element was added to the above tin, and melted and cast at 240° C., thereby producing an Sn—Zn alloy ingot comprising 9% Zn and the balance Sn.

In this sample, the Pb content was 15.1 ppm, the U content was 12 ppb, and the Th content was 10 ppb.

The α dose of the above sample three weeks after melting and casting was the same level as the background α dose; however, the α dose six months after melting and casting clearly increased. The α dose of the sample (the difference from the background α dose) was 0.5 cph/cm$^2$, which did not satisfy the requirements of the present invention. Moreover, when α dose changes of the same sample in five months (between the first month and the sixth month) were observed, the difference in α dose of the sample was 0.01 cph/cm$^2$, which also did not satisfy the requirements of the present invention.

The reason for this is considered to be that: the α dose was temporarily reduced because of sublimation of Po during the melting and casting process; but the Pb content was high, and the $^{210}$Pb content was consequently also high; and therefore the disintegration chain ($^{210}$Pb→$^{210}$Bi→$^{210}$Po→$^{206}$Pb) was reconstructed to increase the α dose.

The invention claimed is:

1. A method for producing a low α-dose tin, characterized in that a raw material tin having a purity level of 3N, containing lead isotope $^{210}$Pb in an amount of 30 Bq/kg or less, and having a proportion of $^{206}$Pb relative to $^{208}$Pb, $^{207}$Pb, $^{206}$Pb and $^{204}$Pb of less than 25% is subjected to leaching with an aqueous solution of hydrochloric acid or sulfuric acid, then electrolytic refining is performed using a leachate produced in the leaching as an electrolytic solution, which is controlled to have a pH of 1.0 or less and a content of tin electrolyte of 30 to 180 g/L, and then an electrolytically refined tin obtained by the electrolytic refining is melted and cast to obtain an ingot of the low α-dose tin giving an α-dose of less than 0.0005 cph/cm$^2$ after the melting and casting.

2. The method for producing a low α-dose tin according to claim 1, characterized in that the α-dose of the ingot of the low α-dose tin is less than 0.0003 cph/cm$^2$.

3. The method for producing a low α-dose tin according to claim 2, characterized in that the α-dose of the ingot of the low α-dose tin measured at an elapsed time of one week, three weeks, one month, two months, six months, or thirty months after the melting and casting is less than 0.0005 cph/cm$^2$.

4. The method for producing low α-dose tin according to claim 2, characterized in that the α-dose of the ingot of the low α-dose tin measured at an elapsed time of one week, three weeks, one month, two months, six months, or thirty months after the melting and casting is less than 0.0003 cph/cm$^2$.

5. The method for producing low α-dose tin according to claim 1, characterized in that the α-dose of the ingot of the low α-dose tin measured at an elapsed time of one week, three weeks, one month, two months, six months, or thirty months after the melting and casting is less than 0.0005 cph/cm$^2$.

6. The method for producing low α-dose tin according to claim 1, characterized in that the α-dose of the ingot of the low α-dose tin measured at an elapsed time of one week, three weeks, one month, two months, six months, or thirty months after the melting and casting is less than 0.0003 cph/cm$_2$.

7. A method for producing a low α-dose tin alloy, characterized in that a raw material tin having a purity level of 3N and containing lead isotope $^{210}$Pb in an amount of 30 Bq/kg or less is subjected to leaching with an aqueous solution of hydrochloric acid or sulfuric acid, then electrolytic refining is performed using a leachate produced in the leaching as an electrolytic solution, which is controlled to have a pH of 1.0 or less and a content of tin electrolyte of 30 to 180 g/L, and then an electrolytically refined tin obtained by the electrolytic refining is mixed with a highly-purified metal and a resultant mixture is alloyed by melting and cast to obtain an ingot of the low α-dose tin alloy giving an α-dose of less than 0.0005 cph/cm$^2$ after the melting and casting, and wherein the low α-dose tin alloy gives an α-dose such that the α-dose measured at a given elapsed time after the melting and casting and that measured at an elapsed time of five months after the time of the preceding measurement have a difference of 0.0001 cph/cm$^2$.

8. The method according to claim 7, wherein the highly purified metal is one or more metals selected from the group consisting of silver, copper and zinc.

9. A method for producing a low α-dose tin alloy, characterized in that a raw material tin that has a purity level of 3N that contains lead isotope $^{210}$Pb in an amount of 30 Bq/kg or less, and that has a proportion of $^{206}$Pb relative to $^{208}$Pb, $^{207}$Pb, $^{206}$Pb and $^{204}$Pb of less than 25%, is subjected to leaching with an aqueous solution of hydrochloric acid or sulfuric acid, then electrolytic is refining is performed using a leachate produced in the leaching as an electrolytic solution which is controlled to have a pH of 1.0 or less and a content of tin electrolyte of 30 to 180 g/L, and then an electrolytically refined tin obtained by the electrolytic refining is mixed with a highly-purified metal and a resultant mixture is alloyed by melting and cast to obtain an ingot of the low α-dose tin alloy giving an α-dose of less than 0.0005 cph/cm$^2$ after the melting and casting.

* * * * *